Feb. 13, 1923.
R. A. MOKRACEK.
LOCK FOR VEHICLES.
FILED AUG. 18, 1921.
1,444,935.
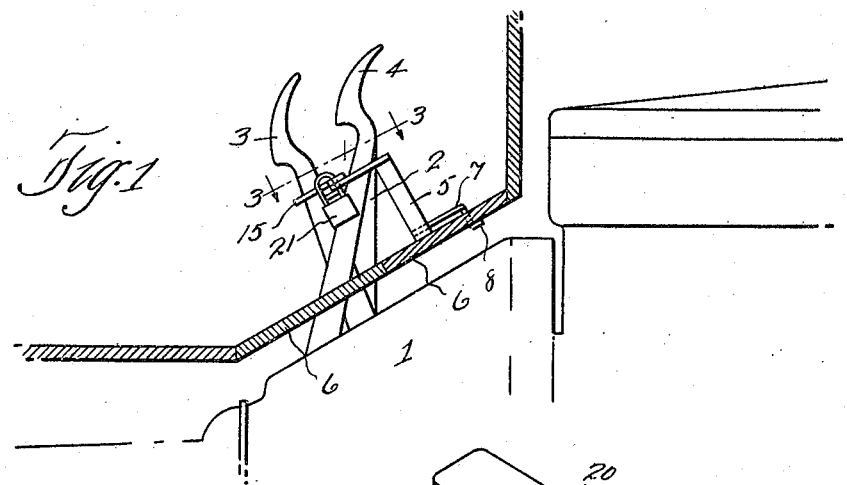
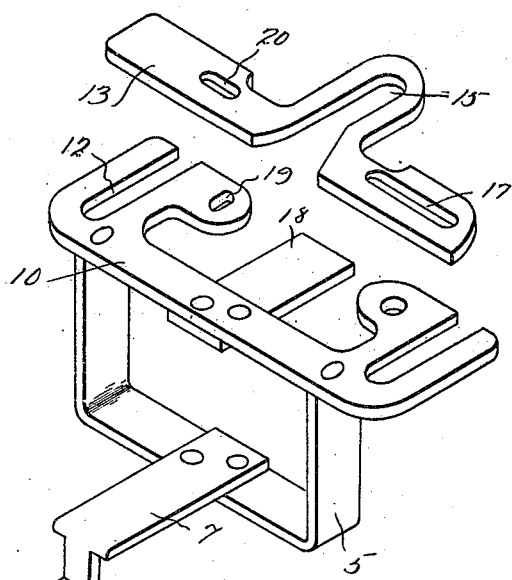
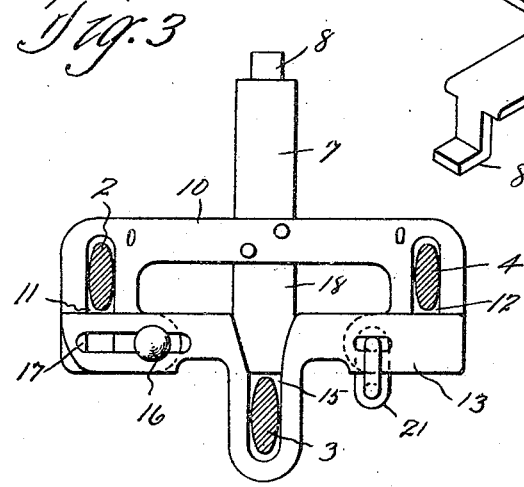

Patented Feb. 13, 1923.

1,444,935

UNITED STATES PATENT OFFICE.

RALPH A. MOKRACEK, OF CLEVELAND, OHIO, ASSIGNOR OF THIRTY-THREE AND ONE-THIRD ONE-HUNDREDTHS TO J. C. KOVAR, OF CLEVELAND, OHIO.

LOCK FOR VEHICLES.

Application filed August 18, 1921. Serial No. 493,275.

*To all whom it may concern:*

Be it known that I, RALPH A. MOKRACEK, a citizen of the United States, residing at Cleveland, in the county of Cuyahoga and State of Ohio, have invented a certain new and useful Improvement in Locks for Vehicles, of which the following is a full, clear, and exact description, reference being had to the accompanying drawings.

This invention relates to locks for motor vehicles and is directed more particularly to a lock for use on vehicles employing a planetary transmission system such as used on Ford automobiles.

Some of the objects of the present invention are to provide a lock of the aforesaid character which may be easily and quickly applied or removed from the transmission operating levers of the vehicle; to provide a lock which shall securely retain the operating levers in a neutral position and which shall comply with those police regulations which forbid the locking of an automobile in such manner that it cannot be rolled on its own wheels; to provide a lock which shall be simple in construction and inexpensive to manufacture, while further objects and advantages will appear as the description proceeds.

In the accompanying drawing wherein I have shown one form of my invention but without intent to limit myself thereto, Fig. 1 is a side elevation of my lock applied to the operating levers of a Ford automobile, the floor boards through which the levers project being shown in section; Fig. 2 is a perspective view of my device, showing the locking bar removed therefrom for clearness; and Fig. 3 is a sectional view taken on the line 3—3 of Fig. 1.

Describing by reference characters, the various parts illustrated, 1 indicates the transmission housing of an internal combustion engine, from which project the operating levers 2, 3 and 4. These levers are adapted to be locked in neutral position by the device shown in detail in Figs. 2 and 3, and which comprises a U-shaped support 5 which is adapted to rest on the floor boards 6 of the machine and support the lock proper in operative position with respect to the levers 2, 3 and 4. An arm 7 fastened to the support 5, projects at substantially right angles therefrom and is provided with a downwardly and forwardly projecting tongue 8 which is adapted to engage the under side of the floor boards and retain the support 5 in an upright position. The lock proper consists of a plate 10, slotted adjacent each end as indicated at 11 and 12 to receive the operating levers 2 and 4 respectively, and a locking bar 13 pivoted thereto and provided intermediate its ends with a slot 15 which is adapted to receive the lever 3. In practice, the locking bar is pivotally and slidably mounted on the plate 10 by means of a rivet 16 passing through a slot 17 formed in said bar, and riveted to the plate 10. The ends of the bar are adapted to project across and close the slots 11 and 12, and an arm 18 projects from the plate 10 and closes the slot 15. Registering apertures 19 and 20 formed in the plate and bar respectively, are adapted to receive a padlock indicated at 21 so that the device may be securely locked about the operating levers and prevent movement thereof.

In operation the locking bar 13 is swung about the pivot 16 so as to open the slot 11 and the tongue 8 is engaged with the underside of the floor boards through the slot provided therein for the operating lever 3. The device is then moved into engagement with the operating levers so that levers 2 and 4 will be engaged in slots 11 and 12 respectively. The locking bar 13 is now swung about its pivot to engage lever 3 in slot 15 and the apertures 19 and 20 brought into register whereupon the padlock 21 may be locked therethrough.

Having thus described my invention, what I claim is:

1. A lock of the class described comprising a plate having a pair of slots, each of which is adapted to receive an operating lever therein, a bar adapted to be moved into engagement with said plate to close said slots, a slot formed in said bar and adapted to receive a third operating lever, means for closing said last mentioned slot and means for locking said bar to said plate.

2. A lock of the class described comprising a plate having a plurality of slots, each of which is adapted to receive an operating lever therein, means having engagement with the underside of the floor boards of a motor vehicle for supporting said plate in operative relationship to said levers, a bar pivotally fastened to said plate and adapted to close said slots, and means for locking said bar to said plate.

3. A lock of the class described comprising a plate having a plurality of slots, each of which is adapted to receive an operating lever therein, a bar pivotally fastened to said plate and having a slot therein for receiving an operating lever, said bar being adapted to close the slots in said plate when moved into engagement therewith, an arm projecting from said plate and adapted to close the slot in said bar, and means for locking said bar to said plate.

4. A lock of the class described comprising a supporting member having a tongue projecting therefrom and adapted to engage the under side of the floor boards of a motor vehicle, and a lock fastened to said supporting member and adapted to engage a plurality of operating levers to prevent movement thereof.

5. A lock of the class described comprising a supporting member having a tongue projecting therefrom and adapted to engage the under side of the floor boards of a motor vehicle, a plate fastened to said supporting member and having a plurality of slots each of which is adapted to receive an operating lever therein, a bar pivotally fastened to said plate and adapted to close said slots, and means for locking said bar to said plate.

In testimony whereof, I hereunto affix my signature.

RALPH A. MOKRACEK.